United States Patent
Lin et al.

(10) Patent No.: US 12,074,563 B2
(45) Date of Patent: Aug. 27, 2024

(54) INVERTER, COMBINER BOX, AND PHOTOVOLTAIC SYSTEM

(71) Applicant: Huawei Digital Power Technologies Co., Ltd., Shenzhen (CN)

(72) Inventors: Tiansan Lin, Shanghai (CN); Peng Ju, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 371 days.

(21) Appl. No.: 17/519,291

(22) Filed: Nov. 4, 2021

(65) Prior Publication Data

US 2022/0060146 A1    Feb. 24, 2022

Related U.S. Application Data

(63) Continuation of application No. PCT/CN2020/106933, filed on Aug. 5, 2020.

(30) Foreign Application Priority Data

Sep. 29, 2019  (CN) .......................... 201910936939.1

(51) Int. Cl.
*H02S 40/32*    (2014.01)
*H02S 40/34*    (2014.01)
*H02S 50/15*    (2014.01)

(52) U.S. Cl.
CPC .............. *H02S 40/32* (2014.12); *H02S 40/34* (2014.12); *H02S 50/15* (2014.12)

(58) Field of Classification Search
CPC .......... H02S 40/32; H02S 40/34; H02S 50/15; H02S 50/10; H02S 40/30; Y02E 10/50
See application file for complete search history.

(56) References Cited

U.S. PATENT DOCUMENTS 9,680,412 B2    6/2017 Stoicescu et al.
2011/0032099 A1*    2/2011 Giesler .............. G08B 13/1409
340/568.1

(Continued)

FOREIGN PATENT DOCUMENTS

CN    104320077 A    1/2015
CN    104682757 A    6/2015

(Continued)

*Primary Examiner* — Thang X Le
*Assistant Examiner* — Haidong Zhang
(74) *Attorney, Agent, or Firm* — Leydig, Voit & Mayer, Ltd.

(57) ABSTRACT

Embodiments of this application disclose a design of an inverter and a design of a combiner box, to reduce maintenance costs of a photovoltaic device. According to the inverter or the combiner box provided in the embodiments of this application, when electroluminescence (EL) defect detection is performed on the photovoltaic device, a reverse charging circuit integrated into the inverter or integrated into the combiner box is used to output a direct current to a to-be-tested photovoltaic string of the photovoltaic device. Whether the to-be-tested photovoltaic string has defects is determined based on a light emission status of the to-be-tested photovoltaic string. By using the foregoing designs, maintenance engineers do not need to modify wiring terminals of the photovoltaic device when performing EL defect tests on the photovoltaic device. This helps reduce maintenance costs of the photovoltaic device.

17 Claims, 6 Drawing Sheets

(56) References Cited

U.S. PATENT DOCUMENTS

2015/0381108 A1\* 12/2015 Höft .................. H02S 50/00
 361/91.1
2018/0342873 A1\* 11/2018 Wang ................ H02S 40/34

FOREIGN PATENT DOCUMENTS

| | | | |
|---|---|---|---|
| CN | 106961118 | A | 7/2017 |
| CN | 107659266 | A | 2/2018 |
| CN | 207541158 | U | 6/2018 |
| CN | 108306612 | A | 7/2018 |
| CN | 110277962 | A | 9/2019 |
| CN | 209562512 | U | 10/2019 |
| CN | 110752825 | A | 2/2020 |
| JP | 2016165221 | A | 9/2016 |
| JP | 2017200285 | A \* | 11/2017 |

\* cited by examiner

INVERTER, COMBINER BOX, AND PHOTOVOLTAIC SYSTEM

CROSS-REFERENCE TO RELATED APPLICATIONS

This application is a continuation of International Application No. PCT/CN2020/106933, filed on Aug. 5, 2020, which claims priority to Chinese Patent Application No. 201910936939.1 filed on Sep. 29, 2019. The disclosures of the aforementioned applications are hereby incorporated by reference in their entireties.

TECHNICAL FIELD

This application relates to the field of photovoltaic technologies, and in particular, to an inverter, a combiner box, and a photovoltaic system.

BACKGROUND

A photovoltaic power generation technology is a low-carbon and eco-friendly energy technology. A photovoltaic system generally includes a photovoltaic device and an inverter (or referred to as a photovoltaic inverter). A core of the photovoltaic device is a photovoltaic module (also referred to as a solar panel). The photovoltaic module is configured to convert solar energy into electrical energy. A plurality of photovoltaic modules are usually connected in series and in parallel to form a photovoltaic string. The photovoltaic device generally includes a plurality of photovoltaic strings. The inverter is configured to convert a direct current generated by the photovoltaic string into an alternating current, and output the alternating current to a power grid.

The photovoltaic module may have internal defects or appearance defects, such as microcracks, fragments, and broken pieces. An electroluminescence (EL) defect detection method is usually used to detect an internal defect of the photovoltaic module. At present, a relatively commonly-used EL defect detection method is as follows. Maintenance engineers modify wiring terminals of an output end of a to-be-tested photovoltaic string; use a direct current power supply prepared by the maintenance engineers to input a direct current into an output end of the to-be-tested photovoltaic string, to implement reverse charging for the to-be-tested photovoltaic string; use a signal collection device (for example, an infrared camera) to collect optical signals emitted by the to-be-tested photovoltaic string; and process the collected optical signals, to implement defect detection on the to-be-tested photovoltaic string.

Because the existing EL defect detection method requires the maintenance engineers to modify wiring terminals, this requires maintenance engineers with high professional skills, and increases maintenance costs of the photovoltaic device.

SUMMARY

Embodiments of this application provide an inverter and a combiner box, to reduce labor costs for testing a photovoltaic device.

To resolve the foregoing technique problem, the embodiments of this application provide the following technical solutions.

According to a first aspect, an embodiment of this application provides an inverter. An input end of the inverter is configured to connect to a photovoltaic string of a photovoltaic device. The inverter may be used in a power generation process and/or a test process of the photovoltaic device. For example, the inverter includes an alternating current power supply circuit and a reverse charging circuit. After the input end of the inverter is connected to the photovoltaic string, in the power generation process of the photovoltaic device, the photovoltaic string may output a direct current to the input end of the inverter when the photovoltaic string is exposed to light. When the alternating current power supply circuit is connected, the alternating current power supply circuit may convert, into an alternating current, the direct current that is input into the inverter, and output the obtained alternating current through an output end of the inverter. In a process of performing an EL test on the photovoltaic device, the reverse charging circuit may output a direct current to the photovoltaic device, to implement reverse charging on the photovoltaic device by the inverter. For ease of distinguishing, the direct current output by the reverse charging circuit to the photovoltaic device is referred to as a first direct current, and the first direct current is used to excite the photovoltaic string to emit light. Then, optical signals generated by the photovoltaic string may be collected, and the collected optical signals are processed, to implement EL defect detection on the to-be-tested photovoltaic string.

The inverter may include a control circuit. The control circuit may be connected to both the reverse charging circuit and the alternating current power supply circuit. The control circuit enables the reverse charging circuit and the alternating current power supply circuit to implement corresponding functions by outputting a control signal to the reverse charging circuit and the alternating current power supply circuit. For example, when the inverter is used in the test process of the photovoltaic device, the control circuit enables the reverse charging circuit to output the first direct current to the photovoltaic string of the photovoltaic device, and enables the alternating current power supply circuit to be disconnected.

In the process of performing the EL test on the photovoltaic device, after the input end of the inverter is connected to the photovoltaic device, an output end of the reverse charging circuit is connected to the photovoltaic device, and a direct current required for the EL test may be output to the photovoltaic device. Compared with a conventional technology, this does not require line reconstruction in the process of performing the EL test on the photovoltaic device, and reduces wiring complexity and labor costs in the test process of the photovoltaic device.

Based on the first aspect, in an embodiment, the reverse charging circuit may be a direct current power supply. Alternatively, based on the first aspect, in a first embodiment of the first aspect, in the process in which the inverter performs reverse charging on the photovoltaic device, a direct current may be input into the reverse charging circuit. For ease of distinguishing, the direct current input into the reverse charging circuit is referred to as a second direct current. Because the direct current is input into the reverse charging circuit, a power supply does not need to be disposed in the reverse charging circuit. This helps reduce a size and complexity of the reverse charging circuit, and reduce costs of the inverter.

Based on the first embodiment of the first aspect, in a second embodiment of the first aspect, the photovoltaic string of the photovoltaic device may include a first photovoltaic string and a second photovoltaic string. The reverse charging circuit may include an output circuit. When the reverse charging circuit is configured to output the first direct current to the photovoltaic device, the reverse charging circuit may be specifically configured to output the first direct current to the first photovoltaic string by using the output circuit, and do not output a direct current to the second photovoltaic string. The first direct current may be used to excite the first photovoltaic string to emit light. The reverse charging circuit may output a direct current to some photovoltaic strings (referred to as the first photovoltaic string) of the photovoltaic device, and does not output a direct current to other photovoltaic strings (referred to as the second photovoltaic string). In a test process of the first photovoltaic string, optical signal interference resulting from light emission of the other photovoltaic strings may be avoided. This helps improve precision of testing the first photovoltaic string.

In an embodiment, after outputting the direct current to the first photovoltaic string, the reverse charging circuit may output a direct current to the second photovoltaic string under control of the control circuit, so that the reverse charging circuit can separately perform reverse charging on different photovoltaic strings of the photovoltaic device. This improves test flexibility.

It should be noted that the first photovoltaic string is different from the second photovoltaic string. The first photovoltaic string may represent one or more photovoltaic strings, and the second photovoltaic string may also represent one or more photovoltaic strings. The photovoltaic device may further include other photovoltaic strings in addition to the first photovoltaic string and the second photovoltaic string.

Based on the second embodiment of the first aspect, in a third embodiment of the first aspect, the inverter may include a first input end and a second input end. The first input end is configured to connect to the first photovoltaic string, and the second input end is configured to connect to the second photovoltaic string. The output circuit includes a first output branch and a second output branch. An input end of the first output branch and an input end of the second output branch are both connected to an input end of the reverse charging circuit. An output end of the first output branch and an output end of the second output branch are respectively connected to the first input end and the second output end. When the reverse charging circuit outputs the first direct current to the photovoltaic device, the reverse charging circuit may be specifically configured to connect the first output branch and disconnect the second output branch. The provided specific implementation helps improve implementability of this embodiment of this application.

Based on any one of the first embodiment to the third embodiment of the first aspect, in a fourth embodiment of the first aspect, the reverse charging circuit may further include an adjustment circuit. When the reverse charging circuit is configured to output the first direct current to the photovoltaic device, the reverse charging circuit is specifically configured to adjust magnitude of the first direct current by using the adjustment circuit. In the process of performing the EL test on the photovoltaic string of the photovoltaic device, the reverse charging circuit may adjust the magnitude of the first direct current to be output to the photovoltaic string of the photovoltaic device, and test the photovoltaic string of the photovoltaic device under first direct currents with different magnitude. This helps enrich test conditions and improve test flexibility.

Based on the fourth embodiment of the first aspect, in a fifth embodiment of the first aspect, an input end of the adjustment circuit may be connected to the input end of the reverse charging circuit, and an output end of the adjustment circuit may be connected to the input end of the inverter.

Based on any one of the first embodiment to the third embodiment of the first aspect, in a sixth embodiment of the first aspect, the reverse charging circuit may further include a detection circuit. The detection circuit may be configured to detect the second direct current, or configured to detect the first direct current. For example, the detection circuit may be a Hall effect sensor. The detection circuit may be connected to the control circuit, and outputs a detection result to the control circuit. This helps improve control precision of the control circuit on the adjustment circuit, and further improve test precision.

Based on any one of the first embodiment to the sixth embodiment of the first aspect, in a seventh embodiment of the first aspect, the inverter further includes a confluence circuit. The confluence circuit may be understood as a part of the alternating current power supply circuit in the inverter. The second direct current that is input into the reverse charging circuit may be provided by the confluence circuit. Specifically, the confluence circuit is configured to receive, through the input end of the inverter, a third direct current output by the photovoltaic string of the photovoltaic device, and output the second direct current to the input end of the reverse charging circuit.

In the process of testing the photovoltaic device, under exposure to the light, the confluence circuit and the reverse charging circuit may be connected, and a circuit between the confluence circuit and the output end of the inverter is disconnected. Under exposure to the light, the photovoltaic device inputs a third direct current into the confluence circuit. Then, the confluence circuit outputs the second direct current to the input end of the reverse charging circuit. The reverse charging circuit may perform reverse charging on the photovoltaic string of the photovoltaic device. The photovoltaic device is used as a power supply in the test process, and there is no need to dispose a direct current power supply for the inverter. This helps reduce costs and a size of the inverter.

In an embodiment, the confluence circuit may include a plurality of confluence branches. Input ends of the plurality of confluence branches are respectively connected to a plurality of input ends of an combiner box. The input end of the reverse charging circuit is connected to output ends of the plurality of confluence branches. Generally, in a process of performing reverse charging on the first photovoltaic string, an alternating current power supply circuit corresponding to the first photovoltaic string needs to be disconnected. In view of this, in an embodiment, assuming that a first confluence branch of the plurality of confluence branches is connected to the first photovoltaic string, and a second confluence branch of the plurality of confluence branches is connected to the second photovoltaic string, the first confluence branch may be disconnected and the second confluence branch is connected in the process of performing reverse charging on the first photovoltaic string.

Based on the seventh embodiment of the first aspect, in an eighth embodiment of the first aspect, the confluence circuit may include a boost conversion circuit, for example, a boost circuit. An output voltage of the boost circuit is higher than an input voltage of the boost circuit. The design in which the output-end voltage of the confluence circuit is higher than the input-end voltage of the confluence circuit helps increase a variation range of the first direct current output by the reverse charging circuit, and further increase a variation range of the test condition.

Based on any one of the first embodiment to the sixth embodiment of the first aspect, in a ninth embodiment of the first aspect, the inverter may further include an inverter circuit. The inverter circuit may be understood as a part of the alternating current power supply circuit in the inverter. The second direct current input into the reverse charging circuit may be provided by the inverter circuit. Specifically, the inverter circuit is configured to convert an alternating current input into the inverter circuit into the second direct current.

Based on any one of the first embodiment to the sixth embodiment of the first aspect, in a tenth embodiment of the first aspect, the inverter further includes a confluence circuit and an inverter circuit. The confluence circuit and the inverter circuit may be understood as some or all circuits in the alternating current power supply circuit in the inverter. An input end of the confluence circuit is connected to the input end of the inverter, an output end of the confluence circuit is connected to an input end of the inverter circuit, and an output end of the inverter circuit is connected to the output end of the inverter.

In an embodiment, in a process in which the inverter outputs an alternating current, the reverse charging circuit is disconnected. The confluence circuit is configured to receive a fourth direct current output by the photovoltaic string of the photovoltaic device, and output the fourth direct current to the input end of the inverter circuit. The inverter circuit is configured to convert the fourth direct current into an alternating current, and output, through the output end of the inverter, the alternating current obtained through conversion.

In an embodiment, the inverter circuit may have the function of inputting the second direct current into the reverse charging circuit. Alternatively, in a embodiment, the confluence circuit may have the function of inputting the second direct current into the reverse charging circuit. Alternatively, both the confluence circuit and the inverter circuit have the function of inputting the second direct current into the reverse charging circuit. For example, based on the tenth embodiment of the first aspect, in an eleventh embodiment of the first aspect, it is assumed that a first time period and a second time period are different time periods in the process of testing the photovoltaic device by the inverter. In the first time period, the inverter circuit may be disconnected; the confluence circuit and the reverse charging circuit are connected; and the confluence circuit may be configured to receive, through the input end of the inverter, the third direct current output by the photovoltaic string of the photovoltaic device, and output the second direct current to the reverse charging circuit. In the second time period, the confluence circuit is disconnected; the inverter circuit and the reverse charging circuit are connected; and the inverter circuit is configured to convert, into the second direct current, the alternating current that is input into the output end of the inverter, and input the second direct current into the reverse charging circuit. In specific implementation, the first time period may be a time period when there is light, and the second time period may be a time period when there is a little light or there is no light.

In the process of testing the photovoltaic device, when there is light, the photovoltaic device may be used as a power supply, and supplies power to the reverse charging circuit through the confluence circuit. When there is no light, the alternating current (for example, an alternating current output by a power grid) that is input into the output end of the inverter may be used as a power supply, and supplies power to the reverse charging circuit through the inverter circuit. This helps save electric energy on the premise that the photovoltaic device can be tested at any time period.

Based on the first aspect or any one of the first embodiment to the eleventh embodiment of the first aspect, in a twelfth embodiment of the first aspect, the control circuit is further configured to: in the process in which the inverter outputs the alternating current, enable the alternating current power supply circuit in the inverter to be connected, and enable the reverse charging circuit to be disconnected. The control circuit is further configured to enable the alternating current power supply circuit in the inverter to be disconnected when the inverter tests the photovoltaic device.

In an embodiment, the control circuit may enable some or all of the reverse charging circuit and the alternating current power supply circuit (for example, the inverter circuit and/or the confluence circuit) to implement some or all of the functions described in the embodiments of the first aspect of this application. The control circuit may be presented in a form of one or more functional units. The functional unit may be an application-specific integrated circuit (application-specific integrated circuit, ASIC), a processor that executes one or more software or firmware programs, a memory, and/or another component that can provide a corresponding function. The functional unit may be implemented in a form of hardware, or may be implemented in a form of a software functional unit.

According to a second aspect, an embodiment of this application provides a combiner box. The combiner box usually includes a plurality of input ends. The plurality of input ends of the combiner box are configured to connect to a plurality of photovoltaic strings of a photovoltaic device. The combiner box may be used in a power generation process and a test process of the photovoltaic device. For example, the combiner box includes a power supply circuit and a reverse charging circuit. After the input ends of the combiner box are connected to the photovoltaic string, in the power generation process of the photovoltaic device, under exposure to the light, the photovoltaic string may output direct currents to the input ends of the combiner box. When the power supply circuit is connected, the power supply circuit may combine the direct currents that are input into the input ends of the combiner box, and output a combined direct current through an output end of combiner box. In the process of performing an EL test on the photovoltaic device, the reverse charging circuit may output a direct current to the photovoltaic device, to implement reverse charging on the photovoltaic device by the combiner box. For ease of distinguishing, the direct current output by the reverse charging circuit to the photovoltaic device is referred to as a first direct current, and the first direct current is used to excite the photovoltaic string to emit light. Then, optical signals generated by the photovoltaic string may be collected, and the collected optical signals are processed, to implement EL defect detection on the to-be-tested photovoltaic string.

The combiner box may include a control circuit. The control circuit may be connected to both the reverse charging circuit and the power supply circuit. The control circuit enables the reverse charging circuit and the power supply circuit to implement some or all of the functions described in this embodiment of the second aspect of this application by outputting a control signal to the reverse charging circuit and the power supply circuit. For example, when the combiner box is used in the test process of the photovoltaic device, the control circuit enables the reverse charging circuit to output the first direct current to the photovoltaic string of the photovoltaic device, and enables the power supply circuit to be disconnected.

In the process of performing the EL test on the photovoltaic device, after the input end of the combiner box is connected to the photovoltaic device, an output end of the reverse charging circuit is connected to the photovoltaic device, and a direct current required for the EL test may be output to the photovoltaic device. Compared with a conventional technology, this does not require line reconstruction in the process of performing the EL test on the photovoltaic device, and reduces wiring complexity and labor costs in the test process of the photovoltaic device.

Based on the second aspect, in a embodiment, the reverse charging circuit may be a direct current power supply. Alternatively, based on the second aspect, in a first embodiment of the second aspect, in the process in which the combiner box performs reverse charging on the photovoltaic device, a direct current may be input into the reverse charging circuit. For ease of distinguishing, the direct current input into the reverse charging circuit is referred to as a second direct current. Because the direct current is input into the reverse charging circuit, a power supply does not need to be disposed in the reverse charging circuit. This helps reduce a size and complexity of the reverse charging circuit, and reduce costs of an inverter.

Based on the first embodiment of the second aspect, in a second embodiment of the second aspect, the photovoltaic string of the photovoltaic device may include a first photovoltaic string and a second photovoltaic string. The reverse charging circuit may include an output circuit. When the reverse charging circuit is configured to output the first direct current to the photovoltaic device, the reverse charging circuit may be specifically configured to output the first direct current to the first photovoltaic string by using the output circuit, and do not output a direct current to the second photovoltaic string. The first direct current may be used to excite the first photovoltaic string to emit light. The reverse charging circuit may output a direct current to some photovoltaic strings (referred to as the first photovoltaic string) of the photovoltaic device, and does not output a direct current to other photovoltaic strings (referred to as the second photovoltaic string). In a test process of the first photovoltaic string, optical signal interference resulting from light emission of the other photovoltaic strings may be avoided. This helps improve precision of testing the first photovoltaic string.

In a embodiment, after outputting the direct current to the first photovoltaic string, the reverse charging circuit may output a direct current to the second photovoltaic string under control of the control circuit, so that the reverse charging circuit can separately perform reverse charging on different photovoltaic strings of the photovoltaic device. This improves test flexibility.

It should be noted that the first photovoltaic string is different from the second photovoltaic string. The first photovoltaic string may represent one or more photovoltaic strings, and the second photovoltaic string may also represent one or more photovoltaic strings. The photovoltaic device may further include other photovoltaic strings in addition to the first photovoltaic string and the second photovoltaic string.

Based on the second embodiment of the second aspect, in a third embodiment of the second aspect, the combiner box may include a first input end and a second input end. The first input end is configured to connect to the first photovoltaic string, and the second input end is configured to connect to the second photovoltaic string. The output circuit includes a first output branch and a second output branch. An input end of the first output branch and an input end of the second output branch are both connected to an input end of the reverse charging circuit. An output end of the first output branch and an output end of the second output branch are respectively connected to the first input end and the second output end. When the reverse charging circuit outputs the first direct current to the photovoltaic device, the reverse charging circuit may be specifically configured to connect the first output branch and disconnect the second output branch. The provided specific implementation helps improve implementability of this embodiment of this application.

Based on any one of the first embodiment to the third embodiment of the second aspect, in a fourth embodiment of the second aspect, the reverse charging circuit may further include an adjustment circuit. When the reverse charging circuit is configured to output the first direct current to the photovoltaic device, the reverse charging circuit is specifically configured to adjust magnitude of the first direct current by using the adjustment circuit. In the process of performing the EL test on the photovoltaic string of the photovoltaic device, the reverse charging circuit may adjust the magnitude of the first direct current to be output to the photovoltaic string of the photovoltaic device, and test the photovoltaic string of the photovoltaic device under first direct currents with different magnitude. This helps enrich test conditions and improve test flexibility.

Based on the fourth embodiment of the second aspect, in a fifth embodiment of the second aspect, an input end of the adjustment circuit may be connected to the input end of the reverse charging circuit, and an output end of the adjustment circuit may be connected to the input end of the combiner box.

Based on any one of the first embodiment to the fifth embodiment of the second aspect, in a sixth embodiment of the second aspect, the reverse charging circuit may further include a detection circuit. The detection circuit may be configured to detect the second direct current, or configured to detect the first direct current. For example, the detection circuit may be a Hall effect sensor. The detection circuit may be connected to the control circuit, and outputs a detection result to the control circuit. This helps improve control precision of the control circuit on the adjustment circuit, and further improve test precision.

Based on any one of the first embodiment to the sixth embodiment of the second aspect, in a seventh embodiment of the second aspect, the combiner box further includes a confluence circuit. The confluence circuit may be understood as a part of the power supply circuit in the combiner box. The second direct current input into the reverse charging circuit may be provided by the confluence circuit. Specifically, the confluence circuit is configured to receive, through the input end of the combiner box, a third direct current output by the photovoltaic string of the photovoltaic device, and output the second direct current to the input end of the reverse charging circuit.

In the process of testing the photovoltaic device, under exposure to the light, the confluence circuit and the reverse charging circuit may be connected, and a circuit between the confluence circuit and an output end of the inverter is disconnected. Under exposure to the light, the photovoltaic device inputs a third direct current into the confluence circuit. Then, the confluence circuit outputs the second direct current to the input end of the reverse charging circuit. The reverse charging circuit may perform reverse charging on the photovoltaic string of the photovoltaic device. The photovoltaic device is used as a power supply in the test process, and there is no need to dispose a direct current power supply for the combiner box. This helps reduce costs and a size of the combiner box.

In an embodiment, the confluence circuit may include a plurality of confluence branches. Input ends of the plurality of confluence branches are respectively connected to the plurality of input ends of the combiner box. The input end of the reverse charging circuit is connected to output ends of the plurality of confluence branches. Generally, in a process of performing reverse charging on the first photovoltaic string, an alternating current power supply circuit corresponding to the first photovoltaic string needs to be disconnected. In view of this, in an embodiment, assuming that a first confluence branch of the plurality of confluence branches is connected to the first photovoltaic string, and a second confluence branch of the plurality of confluence branches is connected to the second photovoltaic string, the first confluence branch may be disconnected and the second confluence branch is connected in the process of performing reverse charging on the first photovoltaic string.

Based on the seventh embodiment of the second aspect, in an eighth embodiment of the second aspect, the confluence circuit may include a boost conversion circuit, for example, a boost circuit. An output voltage of the boost circuit is higher than an input voltage of the boost circuit. The design in which the output-end voltage of the confluence circuit is higher than the input-end voltage of the confluence circuit helps increase a variation range of the first direct current output by the reverse charging circuit, and further increase a variation range of the test condition.

Based on any one of the first embodiment to the sixth embodiment of the second aspect, in a ninth embodiment of the second aspect, the output end of the combiner box may be configured to connect to the inverter. The second direct current input into the reverse charging circuit may be provided by the inverter. For example, the inverter is configured to convert, into the second direct current under control of the control circuit, an alternating current that is input into the inverter.

In an embodiment, in a process in which the inverter outputs an alternating current, the reverse charging circuit is disconnected. The confluence circuit is configured to receive a fourth direct current output by the photovoltaic string of the photovoltaic device, and output the fourth direct current to an input end of the inverter. The inverter is configured to convert the fourth direct current into an alternating current, and output, through the output end of the inverter, the alternating current obtained through conversion.

In an embodiment, the inverter may have the function of inputting the second direct current into the reverse charging circuit. Alternatively, in a embodiment, the confluence circuit may have the function of inputting the second direct current into the reverse charging circuit. Alternatively, both the confluence circuit and the inverter have the function of inputting the second direct current into the reverse charging circuit. For example, based on the tenth embodiment of the second aspect, in an eleventh embodiment of the second aspect, it is assumed that a first time period and a second time period are different time periods in the process of testing the photovoltaic device by the inverter. In the first time period, the inverter may be disconnected; the confluence circuit and the reverse charging circuit are connected; and the confluence circuit may be configured to receive, through the input end of the combiner box, the third direct current output by the photovoltaic string of the photovoltaic device, and output the second direct current to the reverse charging circuit. In the second time period, the confluence circuit is disconnected; the inverter and the reverse charging circuit are connected; and the inverter is configured to convert, into the second direct current, the alternating current input into the output end of the inverter, and input the second direct current into the reverse charging circuit. In specific implementation, the first time period may be a time period when there is light, and the second time period may be a time period when there is a little light or there is no light.

In the process of testing the photovoltaic device, when there is light, the photovoltaic device may be used as a power supply, and supplies power to the reverse charging circuit through the confluence circuit. When there is no light, the alternating current (for example, an alternating current output by a power grid) that is input into the output end of the inverter may be used as a power supply, and supplies power to the reverse charging circuit through the inverter. This helps save electric energy on the premise that the photovoltaic device can be tested at any time period.

Based on the second aspect or any one of the first embodiment to the eleventh embodiment of the second aspect, in a twelfth embodiment of the second aspect, the control circuit is further configured to: in the process in which the inverter outputs the alternating current, enable the inverter and the power supply circuit in the combiner box to be connected, and enable the reverse charging circuit to be disconnected. The control circuit is further configured to enable the inverter and/or the power supply circuit in the combiner box to be disconnected when the combiner box tests the photovoltaic device.

In a embodiment, the control circuit may enable the reverse charging circuit and the confluence circuit to implement some or all of the functions described in the embodiments of the second aspect of this application. The control circuit may be presented in a form of one or more functional units. The functional unit may be an application-specific integrated circuit (application-specific integrated circuit, ASIC), a processor that executes one or more software or firmware programs, a memory, and/or another component that can provide a corresponding function. The functional unit may be implemented in a form of hardware, or may be implemented in a form of a software functional unit.

According to a third aspect, an embodiment of this application provides a photovoltaic electrical signal control system. An input end of the control system is configured to connect to a photovoltaic device, and the control system includes a control circuit and a reverse charging circuit. The reverse charging circuit is configured to: under control of the control circuit, adjust a direct current that is input into the reverse charging circuit to a test electrical signal or referred to as the direct current that satisfies test conditions, and output the test electrical signal to the photovoltaic device, so that the photovoltaic device emits light under excitation of the test electrical signal.

In a embodiment, the control system includes a plurality of input ends, and different input ends of the control system are configured to connect to different photovoltaic strings of the photovoltaic device. The control system includes the control circuit and the reverse charging circuit. The reverse charging circuit is configured to: under control of the control circuit, output the test electrical signal to a to-be-tested first photovoltaic string in a plurality of photovoltaic strings, so that the first photovoltaic string emits light under excitation of the test electrical signal. The photovoltaic electrical signal control system is used in a photovoltaic system. The photovoltaic electrical signal control system is configured to adjust a photovoltaic electrical signal output by the photovoltaic device, provide adjusted electric energy to a load, charge a battery, and the like. The reverse charging circuit is disposed in the control system. An output end of the reverse charging circuit is connected to the input end of the control system in advance. When a user connects the input end of the control system to the photovoltaic device, the output end of the reverse charging circuit is connected to the photovoltaic device, and wiring modification is not required. This reduces maintenance costs of the photovoltaic device.

In a embodiment, the reverse charging circuit further includes an adjustment circuit. The adjustment circuit is configured to adjust magnitude of the test electrical signal.

In a embodiment, the adjustment circuit is a buck circuit.

In a embodiment, the reverse charging circuit further includes an electrical signal detection circuit. The electrical signal detection circuit is configured to detect the test electrical signal, and input a detection result into the control circuit in the control system.

In a embodiment, the control system further includes a confluence circuit. The confluence circuit is configured to input, into the reverse charging circuit, a photovoltaic electrical signal generated by a second photovoltaic string in the plurality of photovoltaic strings. The second photovoltaic string is different from the first photovoltaic string.

In a embodiment, the confluence circuit includes a plurality of confluence branches. Different confluence branches of the plurality of confluence branches are configured to connect to different photovoltaic strings in the plurality of photovoltaic strings.

A first confluence branch is disconnected under control of the control circuit in the control system, and a second confluence branch is connected under control of the control circuit in the control system. The first confluence branch is configured to connect to the first photovoltaic string, and the second confluence branch is configured to connect to the second photovoltaic string.

In an embodiment, the control system includes an inverter circuit. The inverter circuit is configured to convert, into the direct current, an alternating current that is input into the inverter circuit, and input the direct current into the reverse charging circuit.

When an alternating current is input into an output end of an inverter, which serves as a port connected to an external alternating current power supply in a test process, the alternating current that is input into the inverter is converted into a direct current by using an inverter circuit in the inverter, and the obtained direct current is input into the reverse charging circuit. Therefore, there is no need to add an input end of the reverse charging circuit to the inverter.

In an embodiment, the inverter circuit is configured to adjust magnitude of the direct current under control of the control circuit in the control system.

In an embodiment, the control system is the inverter, or includes the inverter and a combiner box.

In an embodiment, the control system is a combiner box.

A fourth aspect of the embodiments of this application provides an inverter. An input end of the inverter is configured to connect to a photovoltaic string of a photovoltaic device. The inverter includes a control circuit and a reverse charging circuit. The control circuit is configured to enable the reverse charging circuit to output a first direct current when the inverter tests the photovoltaic string of the photovoltaic device. The reverse charging circuit is configured to output the first direct current to the photovoltaic string of the photovoltaic device, where the first direct current is used to excite the photovoltaic string of the photovoltaic device to emit light.

Based on the fourth aspect, in a first embodiment of the fourth aspect, input of the reverse charging circuit includes a second direct current.

Based on the first embodiment of the fourth aspect, in a second embodiment of the fourth aspect, the photovoltaic string of the photovoltaic device includes a first photovoltaic string and a second photovoltaic string. The reverse charging circuit includes an output circuit. When the reverse charging circuit is configured to output the first direct current to the photovoltaic string of the photovoltaic device, the reverse charging circuit is specifically configured to output the first direct current to the first photovoltaic string by using the output circuit, where the first direct current is used to excite the first photovoltaic string to emit light.

Based on the second embodiment of the fourth aspect, in a third embodiment of the fourth aspect, the inverter includes a first input end and a second input end. The first input end is configured to connect to the first photovoltaic string, and the second input end is configured to connect to the second photovoltaic string. The output circuit includes a first output branch and a second output branch. An input end of the first output branch and an input end of the second output branch are both connected to an input end of the reverse charging circuit. An output end of the first output branch and an output end of the second output branch are respectively connected to the first input end and the second output end. When the reverse charging circuit outputs the first direct current to the first photovoltaic string, the output circuit is configured to connect the first output branch and disconnect the second output branch.

Based on any one of the first embodiment to the third embodiment of the fourth aspect, in a fourth embodiment of the fourth aspect, the reverse charging circuit further includes an adjustment circuit. When the reverse charging circuit is configured to output the first direct current to the photovoltaic device, the reverse charging circuit is specifically configured to adjust magnitude of the first direct current by using the adjustment circuit.

Based on the fourth embodiment of the fourth aspect, in a fifth embodiment of the fourth aspect, an input end of the adjustment circuit is connected to the input end of the reverse charging circuit, and an output end of the adjustment circuit may be connected to the input end of the inverter.

Based on any one of the first embodiment to the fifth embodiment of the fourth aspect, in a sixth embodiment of the fourth aspect, the reverse charging circuit further includes a detection circuit. The detection circuit is configured to detect the second direct current.

Based on any one of the first embodiment to the sixth embodiment of the fourth aspect, in a seventh embodiment of the fourth aspect, the inverter further includes a confluence circuit. The confluence circuit is configured to receive, through the input end of the inverter, a third direct current output by the photovoltaic string of the photovoltaic device, and output the second direct current.

Based on the seventh embodiment of the fourth aspect, in an eighth embodiment of the fourth aspect, the confluence circuit includes a boost conversion circuit.

Based on any one of the first embodiment to the sixth embodiment of the fourth aspect, in a ninth embodiment of the fourth aspect, the inverter further includes an inverter circuit. The inverter circuit is configured to convert, into the second direct current, an alternating current that is input into the inverter circuit.

Based on any one of the first embodiment to the sixth embodiment of the fourth aspect, in a tenth embodiment of the fourth aspect, the inverter further includes a confluence circuit and an inverter circuit. An input end of the confluence circuit is connected to the input end of the inverter. An output end of the confluence circuit is connected to an input end of the inverter circuit. An output end of the inverter circuit is connected to the output end of the inverter. The confluence circuit is configured to receive, through the input end of the inverter in a first time period, the third direct current output by the photovoltaic string of the photovoltaic device, and output the second direct current. The inverter circuit is configured to convert, into the second direct current in a second time period, an alternating current that is input into the inverter circuit. The first time period and the second time period are different time periods in a process of testing the photovoltaic device by the inverter.

Based on the tenth embodiment of the fourth aspect, in an eleventh embodiment of the fourth aspect, the confluence circuit is configured to receive, in the process in which the inverter outputs the alternating current, a fourth direct current output by the photovoltaic string of the photovoltaic device, and output a fifth direct current to the input end of the inverter circuit. The inverter circuit is configured to: in the process in which the inverter outputs the alternating current, convert the fifth direct current into an alternating current, and output, through the output end of the inverter, the alternating current obtained through conversion.

Based on the fourth aspect or any one of the first embodiment to the eleventh embodiment of the fourth aspect, in a twelfth embodiment of the fourth aspect, the control circuit is further configured to: in the process in which the inverter outputs the alternating current, enable an alternating current power supply circuit in the inverter to be connected, and enable the reverse charging circuit to be disconnected. The control circuit is further configured to enable the alternating current power supply circuit in the inverter to be disconnected when the inverter tests the photovoltaic device.

For specific descriptions of the fourth aspect and the embodiments of the fourth aspect, refer to the content of the first aspect and the embodiments of the first aspect. Details are not described herein again.

A fifth aspect of the embodiments of this application provides a combiner box. An input end of the combiner box is configured to connect to a photovoltaic string of a photovoltaic device. The combiner box includes a control circuit and a reverse charging circuit. The control circuit is configured to enable the reverse charging circuit to output a first direct current when a inverter tests the photovoltaic string of the photovoltaic device. The reverse charging circuit is configured to output the first direct current to the photovoltaic string of the photovoltaic device, where the first direct current is used to excite the photovoltaic string of the photovoltaic device to emit light.

Based on the fifth aspect, in a first embodiment of the fifth aspect, input of the reverse charging circuit includes a second direct current.

Based on the first embodiment of the fifth aspect, in a second embodiment of the fifth aspect, the photovoltaic string of the photovoltaic device includes a first photovoltaic string and a second photovoltaic string. The reverse charging circuit includes an output circuit. When the reverse charging circuit is configured to output the first direct current to the photovoltaic string of the photovoltaic device, the reverse charging circuit is specifically configured to output the first direct current to the first photovoltaic string by using the output circuit, where the first direct current is used to excite the first photovoltaic string to emit light.

Based on the second embodiment of the fifth aspect, in a third embodiment of the fifth aspect, the combiner box includes a first input end and a second input end. The first input end is configured to connect to the first photovoltaic string, and the second input end is configured to connect to the second photovoltaic string. The output circuit includes a first output branch and a second output branch. An input end of the first output branch and an input end of the second output branch are both connected to an input end of the reverse charging circuit. An output end of the first output branch and an output end of the second output branch are respectively connected to the first input end and the second input end. When the reverse charging circuit outputs the first direct current to the first photovoltaic string, the output circuit is configured to connect the first output branch and disconnect the second output branch.

Based on any one of the first embodiment to the fifth embodiment of the fifth aspect, in a fourth embodiment of the fifth aspect, the reverse charging circuit further includes an adjustment circuit. When the reverse charging circuit is configured to output the first direct current to the photovoltaic string of the photovoltaic device, the reverse charging circuit is specifically configured to adjust magnitude of the first direct current by using the adjustment circuit.

Based on the fourth embodiment of the fifth aspect, in a fifth embodiment of the fifth aspect, an input end of the adjustment circuit is connected to the input end of the reverse charging circuit, and an output end of the adjustment circuit may be connected to the input end of the combiner box.

Based on any one of the first embodiment to the fifth embodiment of the fifth aspect, in a sixth embodiment of the fifth aspect, the reverse charging circuit further includes a detection circuit. The detection circuit is configured to detect the second direct current.

Based on any one of the first embodiment to the sixth embodiment of the fifth aspect, in a seventh embodiment of the fifth aspect, the combiner box further includes a confluence circuit. The confluence circuit is configured to receive, through the input end of the combiner box, a third direct current output by the photovoltaic string of the photovoltaic device, and output the second direct current.

Based on the seventh embodiment of the fifth aspect, in an eighth embodiment of the fifth aspect, the confluence circuit includes a boost conversion circuit.

For specific descriptions of the fifth aspect and the embodiments of the fifth aspect, refer to the content of the second aspect and the embodiments of the second aspect. Details are not described herein again.

According to a sixth aspect, an embodiment of this application provides a photovoltaic system. The photovoltaic system includes a photovoltaic device and an inverter, or includes a photovoltaic device and a combiner box, or includes a photovoltaic device, an inverter, and a combiner box. The photovoltaic device includes one or more photovoltaic strings. The inverter is the inverter according to any one of the first aspect or the embodiments of the first aspect, or the inverter according to any one of the fourth aspect or the embodiments of the fourth aspect. The combiner box is the combiner box according to any one of the second aspect or the embodiments of the second aspect, or the combiner box according to any one of the fifth aspect or the embodiments of the fifth aspect.

DESCRIPTION OF EMBODIMENTS

Figure 1:
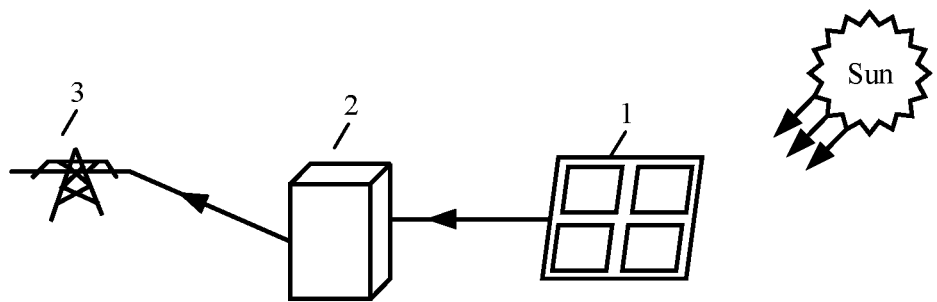
FIG. 1 is a schematic diagram of an existing photovoltaic system.

A photovoltaic power generation technology is a low-carbon and eco-friendly energy technology. FIG. 1 is a schematic diagram of a photovoltaic system. As shown in FIG. 1, the photovoltaic system generally includes a photovoltaic device 1, an inverter 2, and a power grid 3. A core of the photovoltaic device 1 is a photovoltaic module (also referred to as a solar panel). The photovoltaic module is configured to convert solar energy into electrical energy. In the photovoltaic device 1, a plurality of photovoltaic modules are usually connected in series and in parallel to form a photovoltaic string. The photovoltaic string of the photovoltaic device 1 is connected to an input end of the inverter 2 through a cable. A direct current generated under exposure to the light by each photovoltaic module in the photovoltaic string is input into the inverter 2. The inverter 2 is configured to convert the direct current output by the photovoltaic string of the photovoltaic device 1 into an alternating current, and output the alternating current to the power grid 3.

Figure 2:
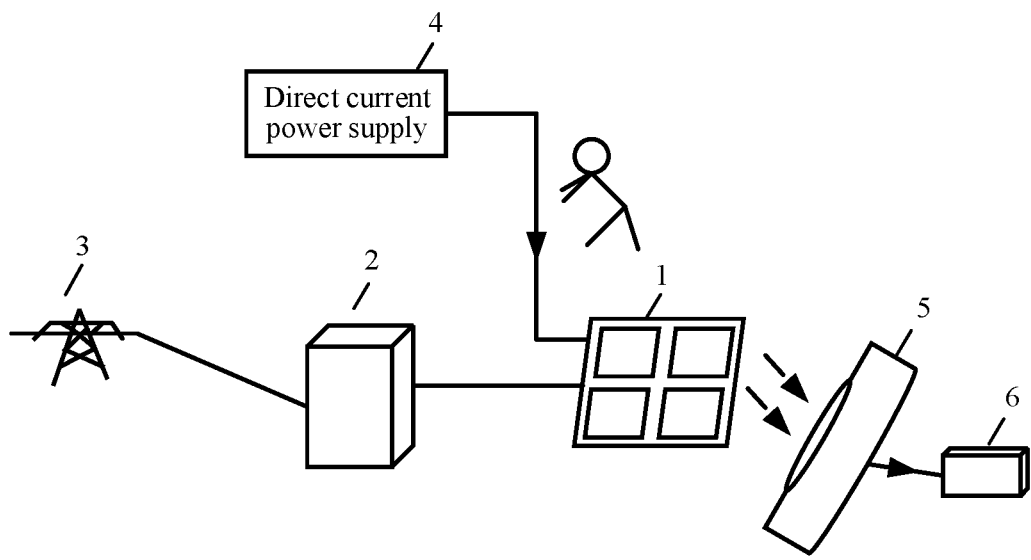
FIG. 2 is a schematic diagram of an existing EL defect detection process.

The photovoltaic module may have internal defects or appearance defects, such as microcracks, fragments, and broken pieces. The photovoltaic module may emit light when a direct current is input. This process is referred to as electroluminescent (EL). Because a direction of the direct current that enables the photovoltaic module to emit light is opposite to a direction of the direct current generated by the photovoltaic module, a process of inputting the direct current into the photovoltaic module is generally referred to as reverse charging. EL defect detection is a common method for detecting a defect status of a photovoltaic module. Refer to FIG. 2. At present, a relatively commonly-used EL defect detection method is as follows. Maintenance engineers modify wiring terminals of an output end of the photovoltaic string of the photovoltaic device 1; use a direct current power supply 4 prepared by the maintenance engineers to implement reverse charging for the photovoltaic string of the photovoltaic device 1; use a signal collection device 5 (for example, an infrared camera) to collect optical signals emitted by the photovoltaic string of the photovoltaic device 1; and process and analyze the collected optical signals, to implement defect detection on the photovoltaic string. In FIG. 1 and FIG. 2, solid lines between devices represent electrical connections between devices, and dashed solid lines with arrows represent light rays.

The existing EL defect detection method requires maintenance engineers to modify wiring terminals of the photovoltaic device. This requires maintenance engineers with high professional skills and therefore increases labor costs for maintaining the photovoltaic device. In addition, it is difficult to implement automatic EL defect detection on the photovoltaic device, and maintenance costs of the photovoltaic device is further increased because the photovoltaic device is usually disposed in a remote area.

To resolve the foregoing problems, embodiments of this application provide an inverter, a combiner box, a photovoltaic system, and a reverse charging circuit. The inverter provided in the embodiments of this application may include the reverse charging circuit provided in the embodiments of this application. The combiner box provided in the embodiments of this application may include the reverse charging circuit provided in the embodiments of this application. The photovoltaic system provided in the embodiments of this application may include the inverter provided in the embodiments of this application, or include the combiner box provided in the embodiments of this application, or include the inverter and the combiner box provided in the embodiments of this application.

The following describes the photovoltaic system provided in the embodiments of this application. In a process of describing the photovoltaic system provided in the embodiments of this application, structures and functions of the inverter, the combiner box, and the reverse charging circuit provided in the embodiments of this application are described.

Figure 3A:
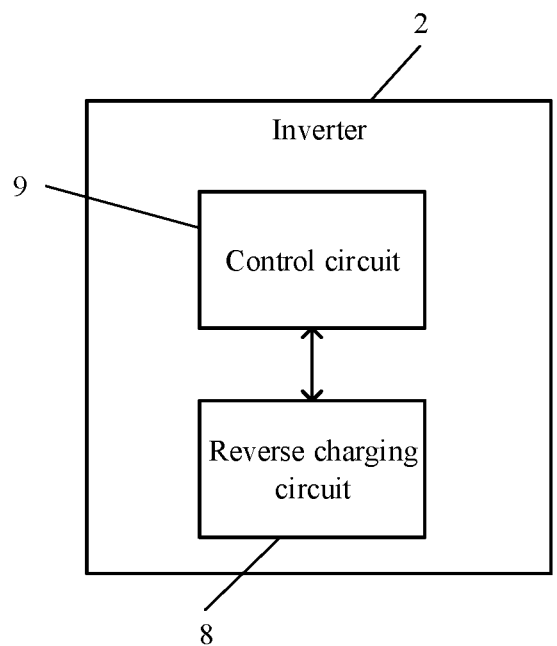
FIG. 3A is a schematic diagram of an embodiment of an inverter according to this application.

Refer to FIG. 3A. In an embodiment of an inverter 2 provided in this application, an input end of the inverter 2 is configured to connect to a photovoltaic string of a photovoltaic device. The inverter 2 includes a control circuit 9 and a reverse charging circuit 8. The control circuit 9 is configured to enable the reverse charging circuit 8 to output a first direct current when the inverter 2 tests the photovoltaic string of the photovoltaic device. The reverse charging circuit 8 is configured to output the first direct current to the photovoltaic string of the photovoltaic device, where the first direct current is used to excite the photovoltaic string of the photovoltaic device to emit light. After the input end of the inverter 2 is connected to an output end of the photovoltaic device, an output end of the reverse charging circuit 8 is electrically connected to the output end of the photovoltaic device, and no line reconstruction is required. This helps save labor costs and implement automatic testing for the photovoltaic string of the photovoltaic device.

The control circuit 9 is connected to the reverse charging circuit 8, and the connection is configured to transmit a control signal generated by the control circuit 9 or a digital signal fed back by the reverse charging circuit, for example, detection information. For example, the connection between the control circuit 9 and the reverse charging circuit 8 may be implemented through power line communication (power line communication, PLC). The PLC technology is a communication mode in which data and media signals are transmitted through power lines. In accompanying drawings of this embodiment of this application, a solid line with bidirectional arrows is used to represent a connection relationship between circuits.

Figure 3B:
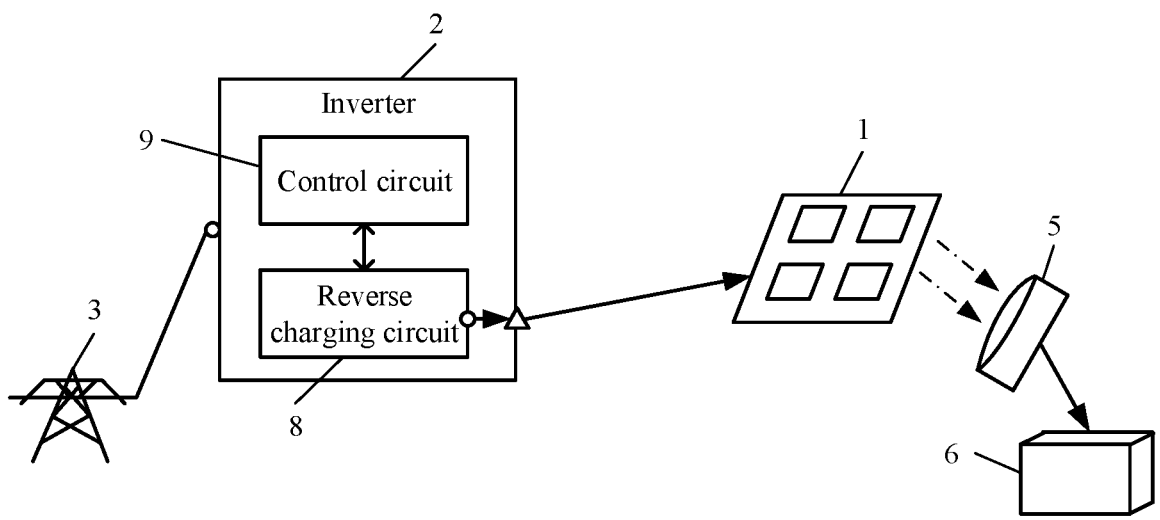
FIG. 3B is a schematic diagram of an embodiment of a photovoltaic system according to this application.

Refer to FIG. 3B. An embodiment of a photovoltaic system provided in this application may include a photovoltaic device 1, an inverter 2, a power grid 3, a signal collection device 5, and a signal processing apparatus 6. An input end of the inverter 2 is configured to connect to an output end of a photovoltaic string of the photovoltaic device 1. An output end of the inverter 2 is configured to connect to the power grid 3.

In a photovoltaic power generation process, under exposure to the light, the photovoltaic device 1 is configured to input a direct current to the input end of the inverter 2. The inverter 2 is configured to convert the input direct current into an alternating current, and output the alternating current to the power grid 3 through the output end of the inverter 2. In the photovoltaic power generation process, for understanding of a direction of the direct current, refer to the direction of the solid-line arrow in FIG. 1. The direction of the direct current in the process is not marked in FIG. 3B.

The inverter 2 in the photovoltaic system provided in this embodiment of this application may include a reverse charging circuit 8 and a control circuit 9. An output end of the reverse charging circuit 8 may be connected to the input end of the inverter 2. After the input end of the inverter 2 is connected to the output end of the photovoltaic device 1, the output end of the reverse charging circuit 8 is electrically connected to the output end of the photovoltaic device 1. Refer to the direction of the solid-line arrow in FIG. 3B, in an EL defect detection process, the reverse charging circuit 8 is configured to output a direct current (referred to as a first direct current) to the photovoltaic device 1 through the input end of the inverter, to implement reverse charging on the photovoltaic device 1. The photovoltaic device 1 may emit light under excitation of the input first direct current. The signal collection device 5 in the photovoltaic system provided in this embodiment of this application is disposed near the photovoltaic device 1, to collect optical signals emitted by the photovoltaic device 1. The signal processing apparatus 6 is connected to the signal collection device 5. The signal processing apparatus 6 may receive the optical signals collected by the signal collection device 5, process and analyze the received optical signals, and detect defects of photovoltaic modules in the photovoltaic device 1.

The control circuit 9 may be connected to the reverse charging circuit 8, and send a control signal to the reverse charging circuit 8. For example, the control circuit 9 may be configured to enable the reverse charging circuit 8 to output the first direct current when the inverter 2 tests the photovoltaic string of the photovoltaic device 1. The reverse charging circuit 8 may implement all or some of functions described in the embodiments of the reverse charging circuit 8 in this application under control of the control signal sent by the control circuit 9.

In some embodiments, the photovoltaic system provided in the embodiments of this application may include fewer or more devices than the embodiment corresponding to FIG. 3B. For example, the photovoltaic system includes only the inverter 2, or includes a transformer between the inverter 2 and the power grid 3, where the transformer is configured to adjust a voltage to be input into the power grid 3.

FIG. 3B shows the input end and the output ends of the inverter and the reverse charging circuit. Specifically, in FIG. 3B, a white triangle represents an input end, and a white circle represents an output end. It should be noted that the input end of the inverter 2 is a port connected between the inverter 2 and the photovoltaic device 1. The output end of the inverter 2 is a port connected between the inverter 2 and the power grid 3.

In an embodiment, the photovoltaic device 1 includes a plurality of photovoltaic strings. The inverter 2 provided in this embodiment of this application may include a plurality of input ends. The plurality of input ends of the inverter 2 are configured to respectively connect to the plurality of photovoltaic strings. In addition, different input ends of the inverter 2 are configured to connect different photovoltaic strings of the photovoltaic device 1. The reverse charging circuit may include a plurality of output ends. The plurality of output ends of the reverse charging circuit are respectively connected to the plurality of input ends of the inverter 2. Different output ends of the reverse charging circuit are connected to different input ends of the inverter 2. The reverse charging circuit 8 may be configured to: under control of the control circuit 9, output a direct current to a to-be-tested photovoltaic string in the plurality of photovoltaic strings of the photovoltaic device 1, and does not output a direct current to other photovoltaic strings of the photovoltaic device 1. For ease of description, the to-be-tested photovoltaic string may be referred to as a first photovoltaic string, and the to-be-tested photovoltaic string may represent one or more photovoltaic strings. The first photovoltaic string may emit light under excitation of the first direct current. It should be noted that, in an embodiment, the reverse charging circuit 8 may sequentially perform reverse charging on different photovoltaic strings of the photovoltaic device 1 under control of the control circuit 9. In an embodiment, the first photovoltaic string may be any one or more photovoltaic strings of the photovoltaic device 1.

In different test scenarios, direct currents with different magnitude need to be input into a photovoltaic string. For example, in a typical scenario in which a photovoltaic module has a typical defect of potential induced degradation (potential induced degradation, PID), in which the photovoltaic module has low parallel resistance, or in which cells of different classes are mixed in the photovoltaic module, a smaller current usually needs to be input into the to-be-tested photovoltaic string. In a typical scenario in which microcracks or breaks occur on solar cells of a photovoltaic module in a photovoltaic string, in which a diode is short-circuited, or in which a photovoltaic string is disconnected, a larger current usually needs to be input into the photovoltaic string. To facilitate adjusting magnitude of the first direct current that is output by the reverse charging circuit 8 to the photovoltaic device 1, in an embodiment, the reverse charging circuit 8 may include an adjustment circuit, configured to adjust the magnitude of the first direct current output by the reverse charging circuit. Optionally, the adjustment circuit may be a buck circuit, for example, a buck circuit. A basic feature of the buck circuit is a direct current DC—direct current DC conversion circuit. An output voltage of the buck circuit is lower than an input voltage of the buck circuit.

In an embodiment, to improve adjustment precision of the first direct current, the reverse charging circuit 8 may include a detection circuit, for example, a Hall effect sensor. The detection circuit may be configured to input a detection result of the first direct current into the control circuit 9. The control circuit 9 may control the adjustment circuit to adjust the magnitude of the first direct current based on the detection result.

In an embodiment, the reverse charging circuit 8 may have a built-in direct current power supply, for example, a rechargeable battery; and use the built-in direct current power supply to perform reverse charging on the photovoltaic device 1. This implementation is easy to implement and reduces difficulty of the solution design.

Alternatively, in an embodiment, the reverse charging circuit 8 may include no power supply, and an external power supply is used to input a direct current into the input end of the reverse charging circuit 8. For ease of distinguishing, the direct current input into the reverse charging circuit 8 may be referred to as a second direct current.

Figure 4A:
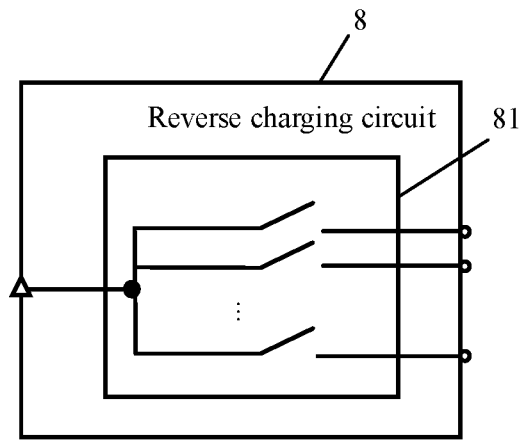
FIG. 4A is a schematic diagram of an embodiment of a reverse charging circuit according to this application.

Refer to FIG. 4A. The reverse charging circuit 8 may include an output circuit 81. An input end of the output circuit 81 may connect to an input end of the reverse charging circuit 8. The output circuit 81 may include a plurality of switching branches. One end of each switching branch is connected to the input end of the reverse charging circuit 8, the other end of each switching branch is connected to an output end of the reverse charging circuit 8, and different switching branches are connected to different output ends of the reverse charging circuit 8. Because different output ends of the reverse charging circuit 8 are configured to connect different photovoltaic strings of the photovoltaic device 1 through an input end of an inverter 2, different switching branches may be connected to different photovoltaic strings.

In an embodiment, each switching branch may include an electrically-controlled switch. The electrically-controlled switch may be turned on or off under control of a control circuit 9 (not shown in FIG. 4A, refer to FIG. 3B). The control circuit 9 may output an input second direct current to a to-be-tested first photovoltaic string by controlling statuses of all electrically-controlled switches. For example, assuming that a switching branch 1 in the plurality of switching branches is connected to a photovoltaic string 1 in a plurality of photovoltaic strings, when an EL defect test needs to be performed on the photovoltaic string 1, the control circuit 9 may control the switching branch 1 to be connected, and control other switching branches to be disconnected. The control circuit 9 inputs, into the photovoltaic string 1, the second direct current that is input into the reverse charging circuit 8, to enable the photovoltaic string 1 to emit light, and perform the EL defect test.

Figure 4B:
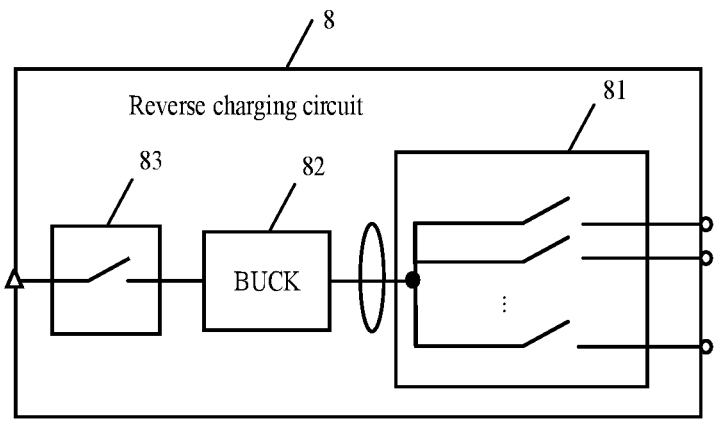
FIG. 4B is a schematic diagram of another embodiment of a reverse charging circuit according to this application.

Refer to FIG. 4B. Another embodiment of the reverse charging circuit 8 provided in the embodiments of this application may include a Hall effect sensor (represented by a white ellipse in FIG. 4B), and an on/off switch 83, a buck circuit 82, and an output circuit 81 that are connected in series. The on/off switch 83 is connected to an input end of the reverse charging circuit 8. For understanding of the output circuit 81, refer to FIG. 4A. A plurality of switching branches of the output circuit 81 are configured to connect to different input ends of the inverter 2. A disposing position of the Hall effect sensor (represented by the white ellipse in FIG. 4B) in FIG. 4B is merely an example. In some embodiments, the position of the Hall effect sensor (represented by the white ellipse in FIG. 4B) may be adjusted. For example, the Hall effect sensor is disposed between the reverse charging circuit 8 and the on/off switch 83.

The on/off switch 83 is a switch that can be turned on or off in case of a high current or a high voltage. For example, the on/off switch 83 is a circuit breaker or a direct current contactor. The output circuit 81 requires a large number of electrically-controlled switches, for example, insulated gate bipolar transistors (insulated gate bipolar transistor, IGBT). A common electrically-controlled switch can be turned on or off only in case of a low current or a low voltage. However, a current or a voltage in a switching branch may be relatively high. To protect the electrically-controlled switch in the switching branch, in a process of connecting the reverse charging circuit 8, the electrically-controlled switch in each switching branch may be turned on first, and then the on/off switch 83 is turned on. In a process of disconnecting the reverse charging circuit 8, the on/off switch 83 may be turned off first, and then the electrically-controlled switch in each switching branch may be turned off.

The buck circuit 82 may adjust magnitude of an input second direct current under control of a control circuit 9 (not shown in FIG. 4B, refer to FIG. 3B), so as to be applicable to photovoltaic modules of different specifications/combinations, and increase an adjustment range of a first direct current input into the photovoltaic string.

The Hall effect sensor (represented by the white ellipse in FIG. 4B) may output a detection result (for example, magnitude of the current) to the control circuit 9 (not shown in FIG. 4B, refer to FIG. 3B), so that the control circuit 9 (reference may be made to FIG. 3B as the control circuit 9 is not shown in FIG. 4B) controls the buck circuit based on the magnitude of the current, and adjusts a test current to a current with magnitude required for a current EL defect test.

Figure 4C:
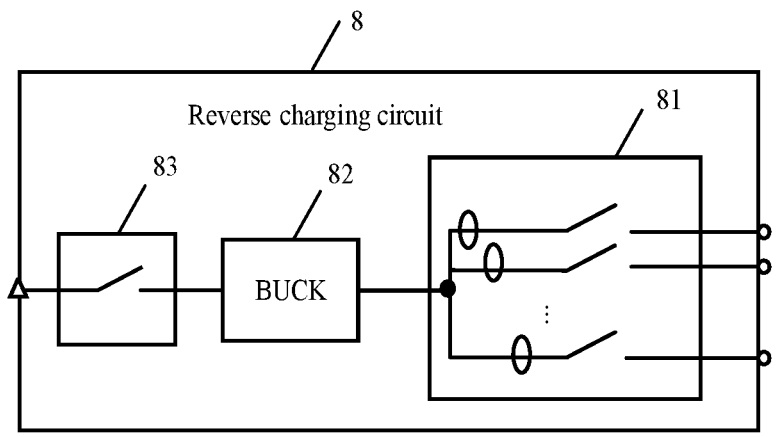
FIG. 4C is a schematic diagram of another embodiment of a reverse charging circuit according to this application.

In actual application, in the reverse charging circuit 8, because the buck circuit 82 has a characteristic of slow start, if the buck circuit 82 is disposed, the on/off switch 83 may not be disposed. A detection circuit of another type may be used to replace the Hall effect sensor (represented by the white ellipse in FIG. 4B) shown in FIG. 4B. Refer to FIG. 4C, the Hall effect sensor (represented by the white ellipse in FIG. 4B) may be disposed in each of the plurality of switching branches, so that the control circuit 9 (not shown in FIG. 4B, refer to FIG. 3B) obtains a direct current in each switching branch, and the control circuit 9 (not shown in FIG. 4B, refer to FIG. 3B) controls a direct current that is input into a photovoltaic string corresponding to any switching branch.

Figure 5:
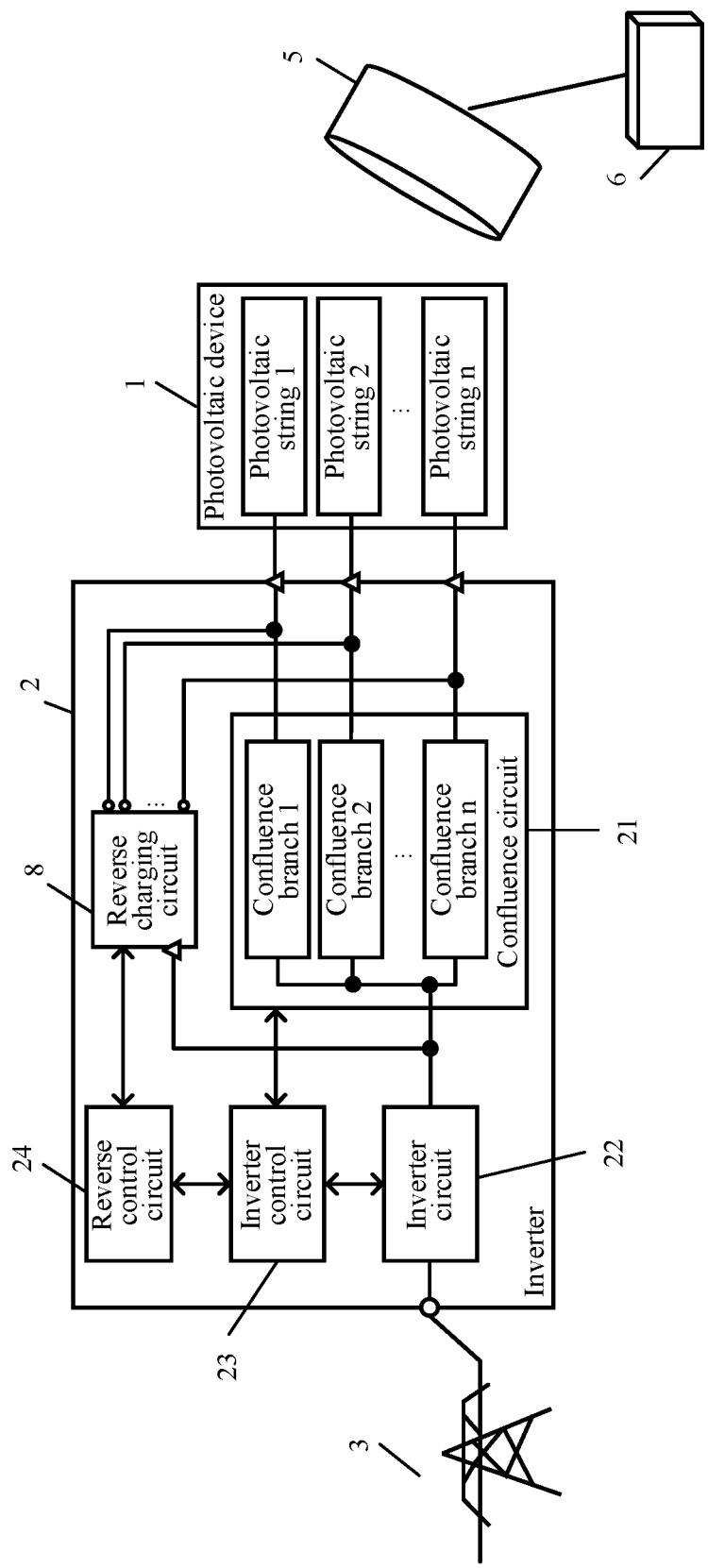
FIG. 5 is a schematic diagram of another embodiment of a photovoltaic system according to this application.

In an embodiment, a direct current power supply that provides the second direct current for the reverse charging circuit may be an inverter circuit or a confluence circuit in the inverter. Refer to FIG. 5. Another embodiment of a photovoltaic system provided in this application may include a photovoltaic device 1, an inverter 2, a power grid 3, a collection device 5, and a signal processing apparatus 6. The photovoltaic device 1 includes a plurality of photovoltaic strings. The inverter 2 may include a confluence circuit 21, an inverter circuit 22, an inverter control circuit 23, a reverse control circuit 24, and a reverse charging circuit 8. In FIG. 5, a white triangle represents an input end, and a white circle represents an output end. In some embodiments, the photovoltaic system may include more or fewer devices provided that the inverter 2 provided in this embodiment of this application is included.

In the embodiment corresponding to FIG. 5, the reverse control circuit 24 and the inverter control circuit 23 may correspond to the control circuit 9 in the embodiments corresponding to FIG. 3A and FIG. 3B. Alternatively, in the embodiment corresponding to FIG. 5, the reverse control circuit 24 may correspond to the control circuit 9 in the embodiments corresponding to FIG. 3A and FIG. 3B.

For example, in FIG. 5, the photovoltaic device 1 includes a photovoltaic string 1 to a photovoltaic string n, where n is a positive integer greater than 2. It should be noted that, for any positive integer i not greater than n, a photovoltaic string i may correspond to one photovoltaic string, or may correspond to a plurality of photovoltaic strings.

The confluence circuit 21 includes a plurality of confluence branches. Different confluence branches are connected to different photovoltaic strings through an input end of the inverter 2. The confluence circuit 21 is configured to: in a process in which the inverter 2 outputs an alternating current, combine direct currents (or referred to as fourth direct currents) input by all photovoltaic strings, and input a direct current obtained through combination (or referred to as a fifth direct current) into an input end of the inverter circuit 22. The fourth direct current and the fifth direct current may have same magnitude but different specific existence forms. The fourth direct current corresponds to a plurality of currents from a plurality of photovoltaic strings, and the fifth current corresponds to a single current, so that a quantity of input ends of the inverter circuit 22 can be reduced. For example, in FIG. 5, the confluence circuit 21 includes a confluence branch 1 to a confluence branch n. For ease of description, for any positive integer i not greater than n, it is assumed that a confluence branch i is connected to the photovoltaic string i.

In an embodiment, each confluence branch may include a boost circuit. Each boost circuit may perform, under control of the inverter control circuit 23, boost processing on the fourth direct current input by the photovoltaic string. In this case, a voltage of the fifth direct current is higher than a voltage of the fourth direct current.

The input end of the inverter circuit 22 may be connected to an output end of the confluence circuit 21. An output end of the inverter circuit 22 may be connected to the power grid.

An input end of the reverse charging circuit 8 is connected to the input end of the inverter circuit 22, or the input end of the reverse charging circuit 8 is connected to the output end of the confluence circuit 21. The reverse charging circuit 8 includes a plurality of output ends. For example, in FIG. 5, the reverse charging circuit 8 includes n output ends. Different output ends of the reverse charging circuit 8 are respectively connected to different input ends of the inverter.

In a photovoltaic power generation process, the reverse control circuit 24 may control the reverse charging circuit 8 not to work (or to be disconnected). For example, the reverse control circuit 24 controls all switching branches in FIG. 4A to be disconnected. The inverter control circuit 23 controls the inverter circuit 22 and the confluence circuit 21 to work (or to be connected). The photovoltaic string 1 to the photovoltaic string n respectively input a direct current into the confluence branch 1 to the confluence branch n under exposure to the light. Each confluence branch performs voltage boosting processing on the input direct current under control of the inverter control circuit 23. Boosted direct currents are combined and input into the input end of the inverter circuit 22. The inverter circuit 22 converts a combined direct current into an alternating current under control of the inverter control circuit 23, and outputs the alternating current to the power grid 3.

In an EL defect detection process, in an embodiment, the inverter circuit 22 in the inverter 2 may provide a second direct current to the reverse charging circuit 8. Specifically, the reverse control circuit 24 may control the reverse charging circuit 8 to work (or to be connected). For example, the reverse control circuit 24 controls the on/off switch 83 in FIG. 4B and a switching branch corresponding to a to-be-test photovoltaic string (it is assumed that the to-be-test photovoltaic string is the photovoltaic string 1) to be connected, and controls switching branches corresponding to other photovoltaic strings to be disconnected. The inverter control circuit 23 controls the inverter circuit 22 to work (or to be connected), and controls the confluence circuit 21 to be disconnected. The output end of the inverter circuit 22 may obtain the alternating current from the power grid 3 under control of the inverter control circuit 23, convert the alternating current into a direct current (that is, the second direct current), and input the direct current into the reverse charging circuit 8. The reverse charging circuit 8 inputs a first direct current into the to-be-tested photovoltaic string (for example, the photovoltaic string 1) under control of the reverse control circuit 24, so that the photovoltaic string 1 emits light under excitation of the first direct current. The signal collection device 5 disposed near the photovoltaic device 1 may collect optical signals sent by the photovoltaic string 1. Then, the signal processing apparatus 6 may process and analyze the optical signals collected by the signal collection device 5, to implement defect detection on a photovoltaic module in the photovoltaic string 1.

Alternatively, when there is light, in the EL defect detection process, in another embodiment, the confluence circuit 21 in the inverter 2 provides the second direct current to the reverse charging circuit 8. Specifically, the reverse control circuit 24 may control the reverse charging circuit 8 to work. For example, the reverse control circuit 24 controls the on/off switch 83 in FIG. 4B and a switching branch corresponding to a to-be-test photovoltaic string (it is assumed that the to-be-test photovoltaic string is the photovoltaic string 1) to be connected, and controls switching branches corresponding to other photovoltaic strings to be disconnected. The inverter control circuit 23 controls the confluence branch 1 to be disconnected, and controls some or all of the confluence branches other than the confluence branch 1 in the confluence circuit 21 to be connected. For example, the inverter control circuit 23 controls a confluence branch 2 to be connected. The inverter control circuit 23 controls the inverter circuit 22 to be disconnected. A third direct current generated by a photovoltaic string 2 is input into the confluence branch 2, and the confluence branch 2 outputs the second direct current to the input end of the reverse charging circuit 8. The reverse charging circuit 8 inputs the first direct current into the photovoltaic string 1 under control of the reverse control circuit 24, so that the photovoltaic string 1 emits light under excitation of the first direct current. The signal collection device 5 disposed near the photovoltaic device 1 may collect optical signals sent by the photovoltaic string 1. Then, the signal processing apparatus 6 may process and analyze the optical signals collected by the signal collection device 5, to implement defect detection on a photovoltaic module in the photovoltaic string 1.

In an embodiment, functions of the reverse control circuit 24 may be integrated into the inverter control circuit 23. Alternatively, the reverse control circuit 24 may be disposed separately from the existing inverter control circuit 23. In an embodiment, the reverse control circuit 24 and the reverse charging circuit 8 may be packaged together.

It may be understood that, in a specific implementation process, optionally, when an EL defect test is performed, it may be determined, depending on a light condition, whether the inverter circuit or the confluence circuit supplies power to the reverse charging circuit. For example, when the light condition is good (for example, in a sunny day), the confluence circuit may supply power to the reverse charging circuit; when the light condition is poor (for example, in a cloudy day or at night), the inverter circuit may supply power to the reverse charging circuit. A specific manner of supplying power may be determined by the control circuit, to enable the inverter circuit or the confluence circuit to supply power. Optionally, the inverter circuit and the confluence circuit may supply power together. In the foregoing method, the manner of supplying power to the reverse power supply circuit may be flexibly selected depending on the light condition, so that a case in which the EL defect test cannot be performed due to the poor light condition can be avoided.

In the foregoing embodiment, the inverter 2 is connected to the photovoltaic device 1. The inverter in the foregoing embodiment is generally referred to as a string inverter. In an embodiment, the inverter 2 may be connected to the photovoltaic device 1 through a combiner box. The inverter 2 in such deployment is referred to as a distributed inverter.

Figure 6A:
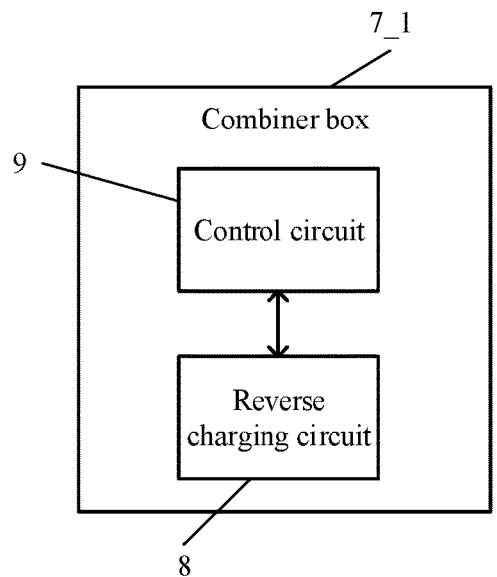
FIG. 6A is a schematic diagram of an embodiment of a combiner box according to this application.

Refer to FIG. 6A. In an embodiment of a combiner box provided in this application, a combiner box 7_1 of a plurality of combiners connected to a distributed inverter is used as an example. An input end (not shown in FIG. 6A) of the combiner box 7_1 is configured to connect to a photovoltaic string of a photovoltaic device. The combiner box 7_1 includes a control circuit 9 and a reverse charging circuit 8. The control circuit 9 is configured to enable the reverse charging circuit 8 to output a first direct current when the combiner box 7_1 tests the photovoltaic string of the photovoltaic device. The reverse charging circuit 8 is configured to output the first direct current to the photovoltaic string of the photovoltaic device, where the first direct current is used to excite the photovoltaic string of the photovoltaic device to emit light. After the input end of the combiner box 7_1 is connected to an output end of the photovoltaic device, an output end of the reverse charging circuit 8 is electrically connected to the output end of the photovoltaic device, and no line reconstruction is required. This helps save labor costs and implement automatic testing for the photovoltaic string of the photovoltaic device.

Figure 6B:
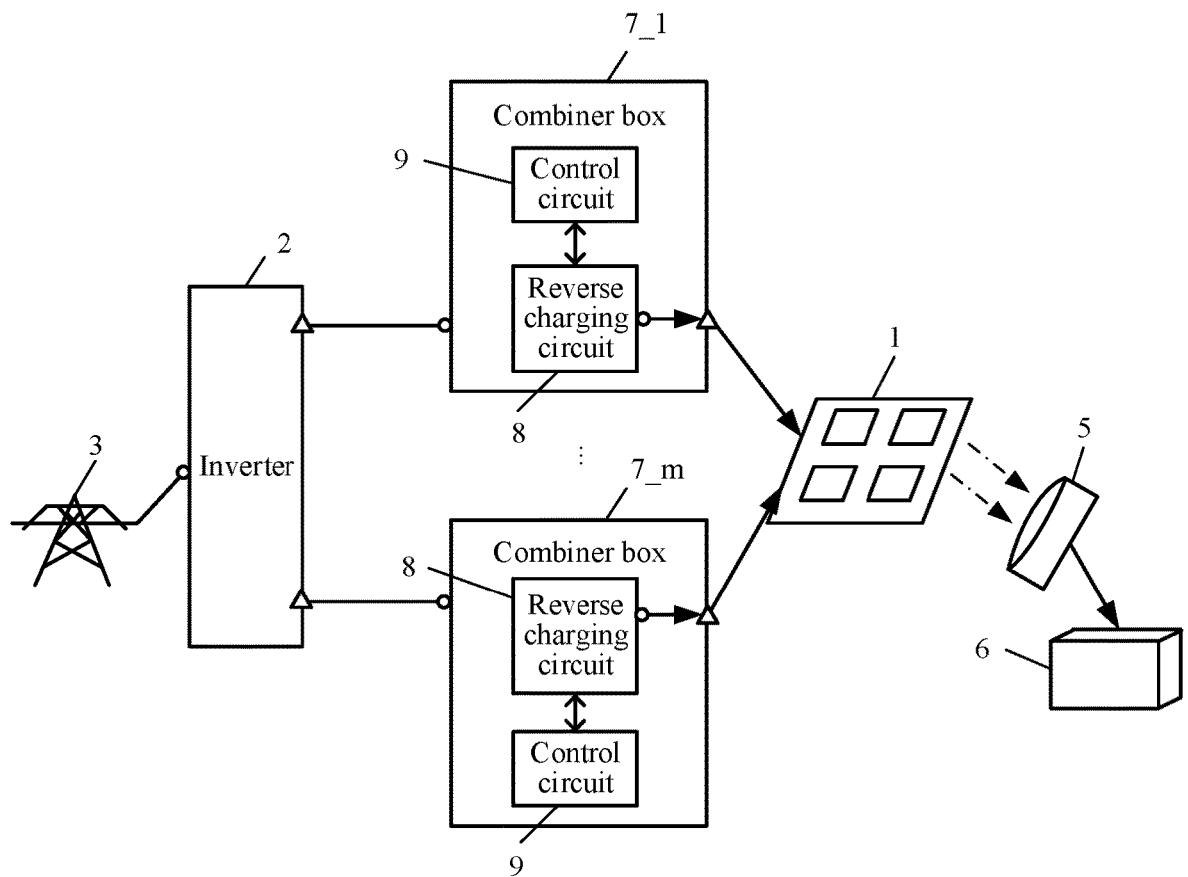
FIG. 6B is a schematic diagram of another embodiment of a photovoltaic system according to this application.

Refer to FIG. 6B, another embodiment of a photovoltaic system provided in the embodiments of this application may include a photovoltaic device 1, a plurality of combiner boxes, (for example, a combiner box 7_1 to a combiner box 7_m in FIG. 6B), an inverter 2, a power grid 3, a collection device 5, and a signal processing apparatus 6. Any combiner box may include a control circuit 9 and a reverse charging circuit 8. An output end of the reverse charging circuit 8 may be connected to an input end of the combiner box in which the reverse charging circuit 8 is located. After the input end of the combiner box is connected to the photovoltaic device 1, the reverse charging circuit 8 is connected to the photovoltaic device 1.

FIG. 6B shows input ends and output ends of the inverter 2 and the combiner box 7_1 to the combiner box 7_m, and shows the output end of the reverse charging circuit 8. Specifically, in FIG. 6B, a white triangle represents an input end, and a white circle represents an output end.

In some embodiments, the photovoltaic system may include more or fewer devices provided that the combiner box provided in this embodiment of this application is included.

In a photovoltaic power generation process, the photovoltaic device 1 is configured to input direct currents into the combiner box 7_1 to the combiner box 7_m. Any combiner box (only examples of the combiner box 7_1 and the combiner box 7_m are shown in FIG. 6B) is configured to combine a plurality of direct currents (a straight line in FIG. 6B represents a plurality of connection lines between the combiner box and the plurality of photovoltaic strings) that are input into a plurality of photovoltaic strings connected to the combiner box. The combiner box inputs a combined direct current into the inverter 2. The inverter 2 is configured to convert the input direct current into an alternating current, and output the alternating current to the power grid 3 through the output end of the inverter 2.

In an EL defect detection process, the reverse charging circuit 8 in any combiner box may input a test direct current (referred to as a first direct current) into the photovoltaic device 1, so that a photovoltaic module in the photovoltaic device 1 emits light under excitation of the first direct current. The signal collection device 5 disposed near the photovoltaic device 1 may collect optical signals sent by the photovoltaic device 1. Then, the signal processing apparatus 6 may process and analyze the optical signals collected by the signal collection device 5, to implement defect detection on the photovoltaic module in the photovoltaic device 1.

For a specific structure of the reverse charging circuit 8 in FIG. 6B, refer to related descriptions in any one of the foregoing embodiments. Details are not described herein again.

Figure 7:
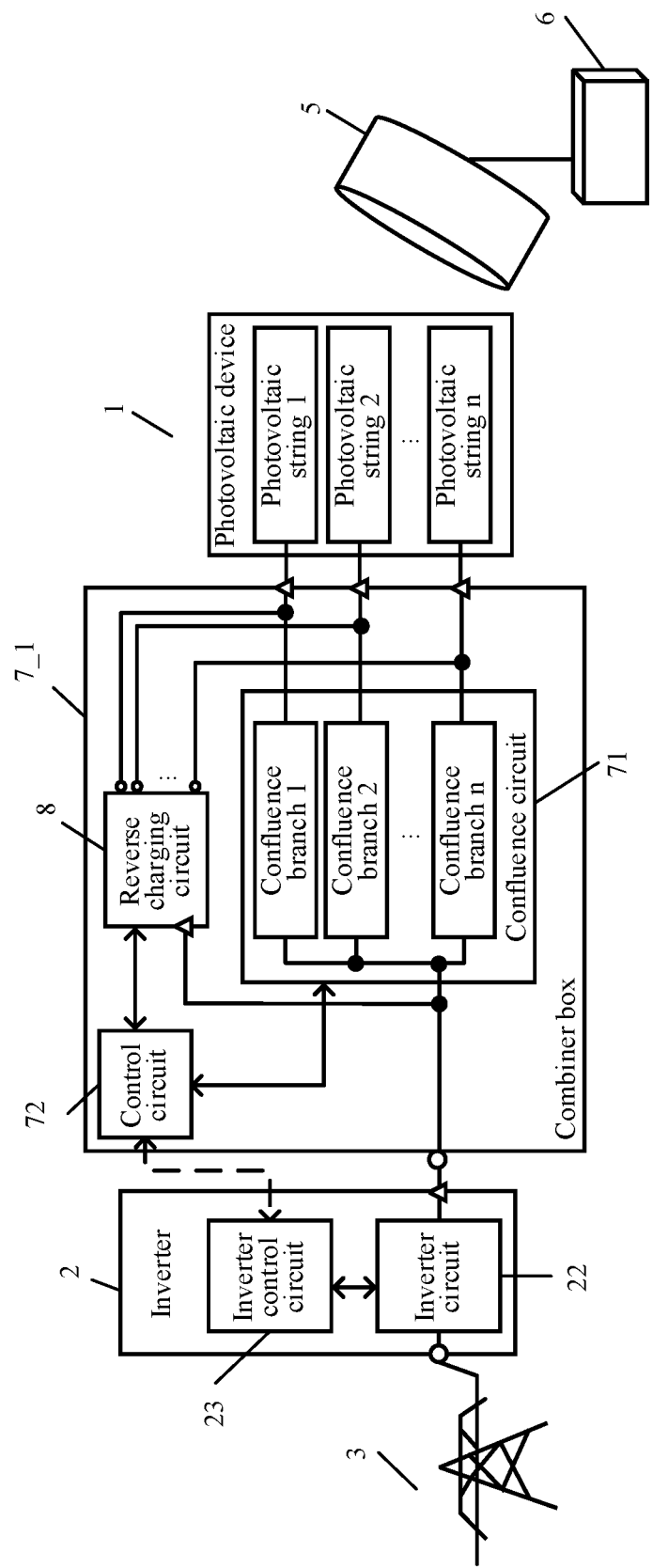
FIG. 7 is a schematic diagram of another embodiment of a photovoltaic system according to this application.

Refer to FIG. 7, another embodiment of a photovoltaic system provided in this application may include a photovoltaic device 1, a plurality of combiner boxes, (only an example of a combiner box 7_1 is shown in FIG. 7), an inverter 2, a power grid 3, a collection device 5, and a signal processing apparatus 6. The combiner box 7_1 may include a confluence circuit 71, a control circuit 72 and a reverse charging circuit 8. A plurality of output ends of the reverse charging circuit 8 may be respectively connected to a plurality of input ends of the combiner box 7_1. After the plurality of input ends of the combiner box 7_1 are respectively connected to a plurality of photovoltaic strings of the photovoltaic device 1, the reverse charging circuit 8 is connected to the photovoltaic strings of the photovoltaic device 1. In FIG. 7, a white triangle represents an input end, and a white circle represents an output end. In some embodiments, the photovoltaic system may include more or fewer devices provided that the combiner box 7_1 provided in this embodiment of this application is included.

In the embodiment corresponding to FIG. 7, the control circuit 72 may correspond to the control circuit 9 in the embodiments corresponding to FIG. 6A and FIG. 6B.

For example, in FIG. 7, a photovoltaic string 1 to a photovoltaic string n in the photovoltaic device 1 are connected to the combiner box 7_1. It should be noted that, for any positive integer i not greater than n, a photovoltaic string i may correspond to one photovoltaic string, or may correspond to a plurality of photovoltaic strings.

The confluence circuit 71 includes a plurality of confluence branches. Different confluence branches are respectively connected to different photovoltaic strings. The confluence circuit 71 is configured to combine direct currents input by the plurality of photovoltaic string, and input a combined direct current (or referred to as a fifth direct current) into the inverter 2. For example, in FIG. 7, the confluence circuit 71 includes a confluence branch 1 to a confluence branch n. For ease of description, for any positive integer i not greater than n, it is assumed that a confluence branch i is connected to the photovoltaic string i.

In an embodiment, each confluence branch may include a boost circuit (not specifically shown in FIG. 7). Each boost circuit may perform, under control of the control circuit 72, boost processing on a direct current input by the photovoltaic string.

The inverter 2 may include an inverter circuit 22 and an inverter control circuit 23. An input end of the inverter circuit 22 may be connected to an output end of the confluence circuit 71. An output end of the inverter circuit 22 may be connected to the power grid 3.

An input end of the reverse charging circuit 8 is connected to the output end of the confluence circuit 71. The reverse charging circuit 8 includes a plurality of output ends. For example, in FIG. 7, the reverse charging circuit 8 includes n output ends. Different output ends of the reverse charging circuit 8 are respectively connected to input ends of different confluence branches of the confluence circuit 71.

In a photovoltaic power generation process, the control circuit 72 may control the reverse charging circuit 8 not to work (or to be disconnected). For example, the control circuit 72 controls all switching branches in FIG. 4A to be disconnected. The inverter control circuit 23 controls the inverter circuit 22 to work. The control circuit 72 controls the confluence circuit 71 to work. The photovoltaic string 1 to the photovoltaic string n respectively input a generated direct current (referred to as a fourth direct current) into the confluence branch 1 to the confluence branch n under exposure to the light. In some embodiments, the confluence circuit 71 may further perform boosting processing on the fourth direct current). Each confluence circuit 71 combines the input fourth direct currents under control of the control circuit 72, and outputs a combined direct current (referred to as a fifth direct current) to the input end of the inverter circuit 22. The inverter circuit 22 converts the input fifth direct current into an alternating current under control of the inverter control circuit 23, and outputs the alternating current to the power grid 3.

In an EL defect detection process, in an embodiment, a direct current power supply that provides a second direct current for the reverse charging circuit 8 may be the inverter circuit 22 in the inverter 2. Specifically, the control circuit 72 may control the reverse charging circuit 8 to work. For example, the control circuit 72 controls the on/off switch 83 in FIG. 4B and a switching branch corresponding to a to-be-test photovoltaic string to be connected, and controls switching branches corresponding to other photovoltaic strings or referred to as a second photovoltaic string to be disconnected. It is assumed that the to-be-test photovoltaic string is the photovoltaic string 1. The inverter control circuit 23 controls the inverter circuit 22 to work (or to be connected). The control circuit 72 controls the confluence circuit 71 to be disconnected. The output end of the inverter circuit 22 may obtain the alternating current from the power grid 3 under control of the inverter control circuit 23, convert the alternating current into the second direct current, and input the second direct current into the reverse charging circuit 8. The reverse charging circuit 8 inputs the first direct current into the photovoltaic string 1 under control of the control circuit 72, so that the photovoltaic string 1 emits light under excitation of the first direct current. The signal collection device 5 disposed near the photovoltaic device 1 may collect optical signals sent by the photovoltaic string 1. Then, the signal processing apparatus 6 may process and analyze the optical signals collected by the signal collection device 5, to implement defect detection on a photovoltaic module in the photovoltaic string 1.

Alternatively, when there is light, in the EL defect detection process, in another embodiment, a direct current power supply that provides the first direct current for the reverse charging circuit 8 may be the confluence circuit 71 in the combiner box 7_1. Specifically, the control circuit 72 may control the reverse charging circuit 8 to work. For example, the control circuit 72 controls the on/off switch 83 in FIG. 4B and a switching branch corresponding to a to-be-test photovoltaic string (it is assumed that the to-be-test photovoltaic string is the photovoltaic string 1) to be connected, and controls switching branches corresponding to other photovoltaic strings (or referred to as the second photovoltaic string) to be disconnected. The control circuit 72 controls the confluence branch 1 to be disconnected. The control circuit 72 controls some or all of the confluence branches other than the confluence branch 1 in the confluence circuit 71 to be connected. For example, the control circuit 72 controls a confluence branch 2 to be connected. The inverter control circuit 23 controls the inverter circuit 22 to be disconnected. A third direct current generated by a photovoltaic string 2 is output to the confluence branch 2, and the confluence branch 2 outputs the second direct current to the reverse charging circuit 8. The reverse charging circuit 8 inputs the first direct current into the photovoltaic string 1 under control of the control circuit 72, so that the photovoltaic string 1 emits optical signals under excitation of the first direct current. The signal collection device 5 disposed near the photovoltaic device 1 may collect optical signals sent by the photovoltaic string 1. Then, the signal processing apparatus 6 may process and analyze the optical signals collected by the signal collection device 5, to implement defect detection on a photovoltaic module in the photovoltaic string 1.

In an embodiment, the control circuit 72 may be communicatively connected to the inverter control circuit 23 (represented by a dashed line with bidirectional arrows in FIG. 7). In an embodiment, the control circuit 72 and the reverse charging circuit 8 may be packaged together.

It should be understood that the inverter provided in this application may work in different status. In a first working state, a built-in reverse charging circuit is in a disconnected state. The inverter is mainly configured to convert a direct current generated by a photovoltaic string in the photovoltaic device into an alternating current, and input the alternating current into the power grid. In a second working state, the built-in reverse charging circuit is in a connected state. The inverter is mainly configured to output a direct current to a to-be-tested photovoltaic string of the photovoltaic device by using the reverse charging circuit, to perform an EL defect test. In a specific implementation process, a working state of the inverter may be controlled by the control circuit. Optionally, the control circuit may implement the foregoing functions by executing computer program code stored in a memory of the inverter. Alternatively, optionally, the control circuit may execute operation instructions received by the inverter from an operator, to implement the foregoing functions.

It should be understood that the combiner box provided in this application may also work in different status. In a first working state, a built-in reverse charging circuit is in a disconnected state. The combiner box is mainly configured to combine direct currents generated by photovoltaic strings in the photovoltaic device, and input a direct current into the inverter. In a second working state, the built-in reverse charging circuit is in a connected state. The combiner box is mainly configured to output a direct current to a to-be-tested photovoltaic string of the photovoltaic device by using the reverse charging circuit, to perform an EL defect test. In a specific implementation process, a working state of the combiner box may be controlled by the control circuit. Optionally, the control circuit may implement the foregoing functions by executing computer program code stored in a memory of the combiner box. Alternatively, optionally, the control circuit may execute operation instructions received by the combiner box from an operator, to implement the foregoing functions.

Optionally, the reverse charging circuit includes a power supply, and no external power supply or another power supply circuit is required. This solution is simple and easy to implement.

Optionally, the reverse charging circuit is powered by the inverter circuit and/or the confluence circuit. In a specific implementation process, an implementation solution may be flexibly selected depending on a light condition, so that a case in which an EL test cannot be performed due to a poor light condition can be avoided. This helps improve maintenance flexibility.

It should be noted that, in the descriptions of this application, "/" indicates an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the descriptions of this application, unless otherwise specified, "a plurality of" means two or more than two. "At least one of the following" or similar expressions indicate any combination of the following, including any combination of one or more of the following. For example, at least one of a, b, or c may represent a, b, c, a combination of a and b, a combination of a and c, a combination of b and c, or a combination of a, b, and c, where a, b, and c may be in a singular or plural form.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An inverter, wherein an input end of the inverter is configured to connect to at least one photovoltaic string of a photovoltaic device, and the inverter comprises a control circuit, a reverse charging circuit, and a confluence circuit;

the control circuit is configured to enable the reverse charging circuit to output a first direct current when the inverter tests the at least one photovoltaic string of the photovoltaic device;

the reverse charging circuit is configured to output the first direct current to the at least one photovoltaic string of the photovoltaic device, wherein an input of the reverse charging circuit comprises a second direct current;

the confluence circuit is configured to receive, through the input end of the inverter, a third direct current output by the at least one photovoltaic string of the photovoltaic device, and output the second direct current; and wherein the first direct current is used to excite the at least one photovoltaic string of the photovoltaic device to emit light.

2. The inverter according to claim 1, wherein the at least one photovoltaic string of the photovoltaic device comprises a first photovoltaic string and a second photovoltaic string;

the reverse charging circuit comprises an output circuit;

when the reverse charging circuit is configured to output the first direct current to the at least one photovoltaic string of the photovoltaic device, the reverse charging circuit is configured to output the first direct current to the first photovoltaic string using the output circuit; and the first direct current is used to excite the first photovoltaic string to emit light.

3. The inverter according to claim 2, wherein the inverter comprises a first input end and a second input end, the first input end is configured to connect to the first photovoltaic string, and the second input end is configured to connect to the second photovoltaic string;

the output circuit comprises a first output branch and a second output branch, an input end of the first output branch and an input end of the second output branch are both connected to an input end of the reverse charging circuit, and an output end of the first output branch and an output end of the second output branch are respectively connected to the first input end and the second input end; and when the reverse charging circuit outputs the first direct current to the first photovoltaic string, the output circuit is configured to connect the first output branch and disconnect the second output branch.

4. The inverter according to claim 1, wherein the reverse charging circuit further comprises an adjustment circuit; and when the reverse charging circuit is configured to output the first direct current to the photovoltaic device, the reverse charging circuit is configured to adjust a magnitude of the first direct current using the adjustment circuit.

5. The inverter according to claim 4, wherein an input end of the adjustment circuit is connected to an input end of the reverse charging circuit, and an output end of the adjustment circuit is connected to the input end of the inverter.

6. The inverter according to claim 1, wherein the reverse charging circuit further comprises a detection circuit; and the detection circuit is configured to detect the second direct current.

7. The inverter according to claim 1, wherein the confluence circuit comprises a boost conversion circuit.

8. The inverter according to claim 1, wherein the inverter further comprises an inverter circuit; and the inverter circuit is configured to convert, into the second direct current, an alternating current that is input into the inverter circuit.

9. The inverter according to claim 1, wherein the inverter further comprises an inverter circuit, an input end of the confluence circuit is connected to the input end of the inverter, an output end of the confluence circuit is connected to an input end of the inverter circuit, and an output end of the inverter circuit is connected to an output end of the inverter;

the confluence circuit is configured to receive, through the input end of the inverter in a first time period, the third direct current output by the at least one photovoltaic string of the photovoltaic device, and output the second direct current;

the inverter circuit is configured to convert, into the second direct current, an alternating current that is input into the inverter circuit in a second time period; and the first time period and the second time period are different time periods in a process of testing the photovoltaic device by the inverter.

10. The inverter according to claim 9, wherein the confluence circuit is configured to: in a process in which the inverter outputs the alternating current, receive a fourth direct current output by the at least one photovoltaic string of the photovoltaic device, and output a fifth direct current to the input end of the inverter circuit; and the inverter circuit is configured to: in the process in which the inverter outputs the alternating current, convert the fifth direct current into an alternating current, and output, through the output end of the inverter, the alternating current obtained through conversion.

11. The inverter according to claim 1, wherein the control circuit is further configured to: in a process in which the inverter outputs an alternating current, enable an alternating current power supply circuit in the inverter to be connected, and enable the reverse charging circuit to be disconnected; and the control circuit is further configured to enable the alternating current power supply circuit in the inverter to be disconnected when the inverter tests the photovoltaic device.

12. A combiner box, wherein an input end of the combiner box is configured to connect to a photovoltaic string of a photovoltaic device, and the combiner box comprises a control circuit, a reverse charging circuit, and a confluence circuit;

the control circuit is configured to enable the reverse charging circuit to output a first direct current when the combiner box tests the photovoltaic string of the photovoltaic device;

the reverse charging circuit is configured to output the first direct current to the photovoltaic string of the photovoltaic device, wherein an input of the reverse charging circuit comprises a second direct current;

the confluence circuit is configured to receive, through the input end of the combiner box, a third direct current output by the photovoltaic string of the photovoltaic device, and output the second direct current; and wherein the first direct current is used to excite the photovoltaic string of the photovoltaic device to emit light.

13. The combiner box according to claim 12, wherein the photovoltaic string of the photovoltaic device comprises a first photovoltaic string and a second photovoltaic string;

the reverse charging circuit comprises an output circuit;

when the reverse charging circuit is configured to output the first direct current to the photovoltaic string of the photovoltaic device, the reverse charging circuit is configured to output the first direct current to the first photovoltaic string using the output circuit; and the first direct current is used to excite the first photovoltaic string to emit light.

14. The combiner box according to claim 13, wherein the combiner box comprises a first input end and a second input end, the first input end is configured to connect to the first photovoltaic string, and the second input end is configured to connect to the second photovoltaic string;

the output circuit comprises a first output branch and a second output branch, an input end of the first output branch and an input end of the second output branch are both connected to an input end of the reverse charging circuit, and an output end of the first output branch and an output end of the second output branch are respectively connected to the first input end and the second output end; and when the reverse charging circuit outputs the first direct current to the first photovoltaic string, the output circuit is configured to connect the first output branch and disconnect the second output branch.

15. The combiner box according to claim 12, wherein the reverse charging circuit further comprises an adjustment circuit; and when the reverse charging circuit is configured to output the first direct current to the photovoltaic string of the photovoltaic device, the reverse charging circuit is configured to adjust a magnitude of the first direct current using the adjustment circuit.

16. The combiner box according to claim 15, wherein an input end of the adjustment circuit is connected to an input end of the reverse charging circuit, and an output end of the adjustment circuit is connected to the input end of the combiner box.

17. The combiner box according to claim 12, wherein the reverse charging circuit further comprises a detection circuit; and the detection circuit is configured to detect the second direct current.

* * * * *